May 24, 1927.  1,629,705
C. G. HOLMBERG, JR., ET AL
MATERIAL WORKING MECHANISM
Filed April 28, 1924   2 Sheets-Sheet 1
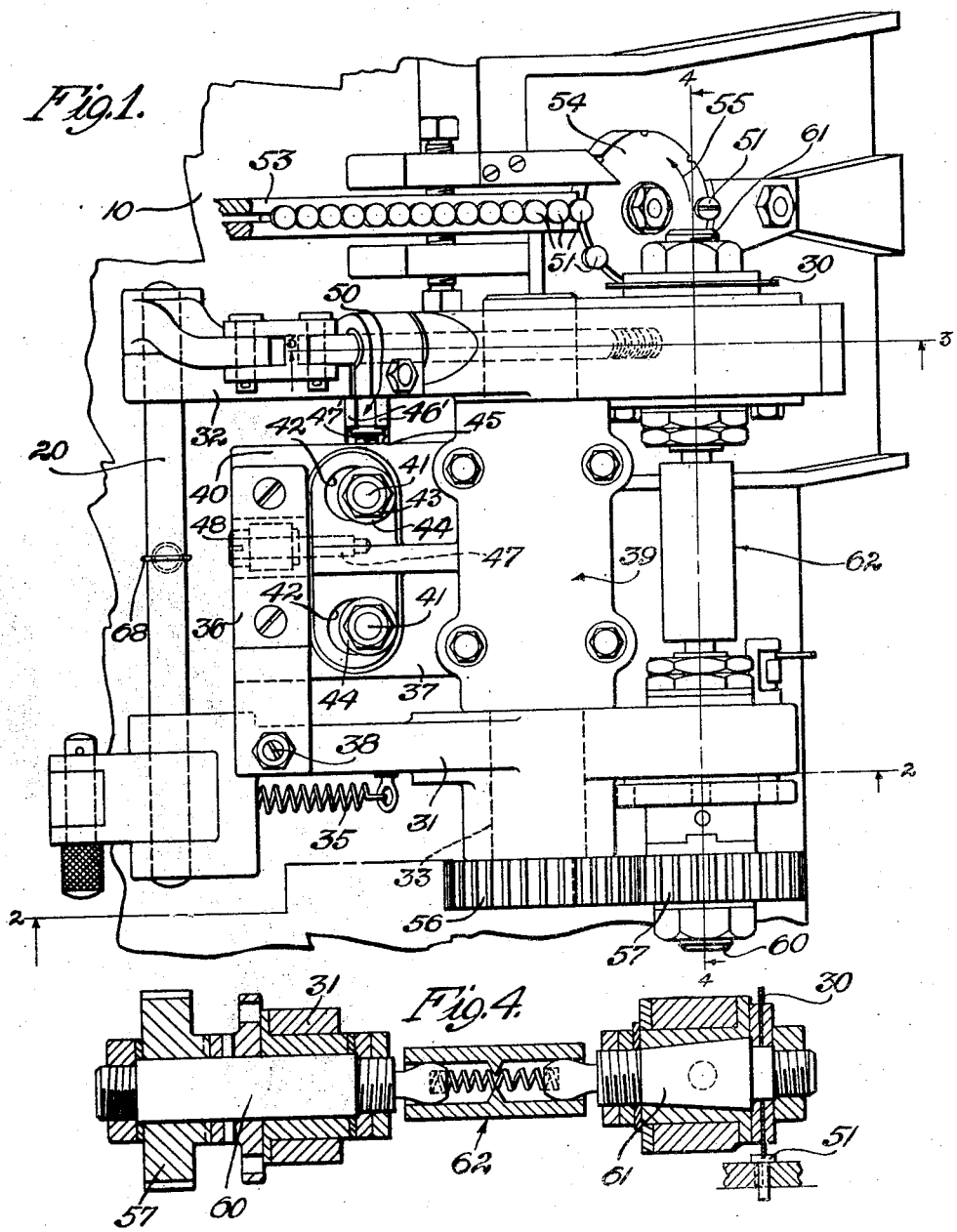

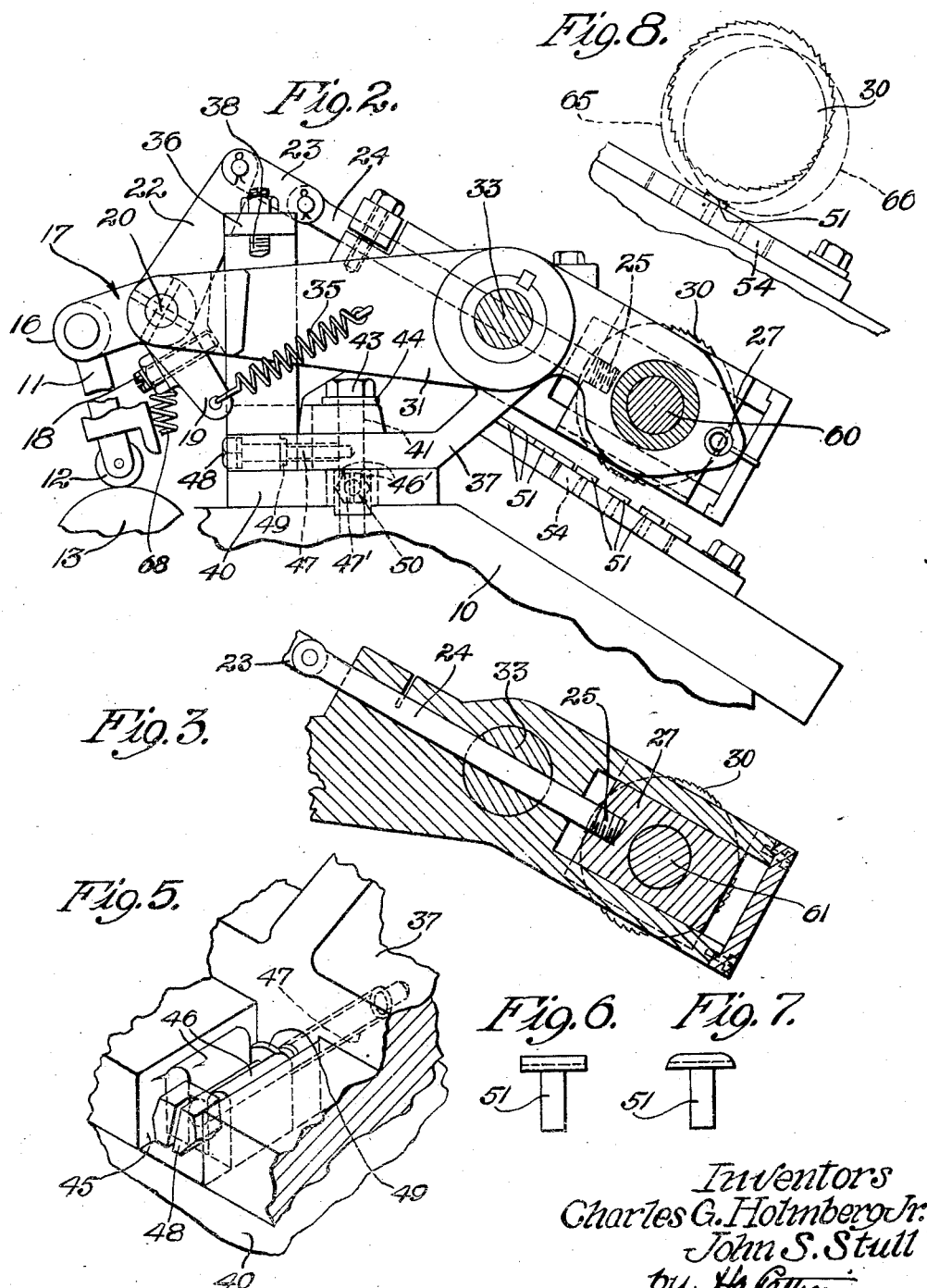

Patented May 24, 1927.

1,629,705

UNITED STATES PATENT OFFICE.

CHARLES GUNNAR HOLMBERG, JR., OF OAK PARK, AND JOHN STANLEY STULL, OF CHICAGO, ILLINOIS, ASSIGNORS TO WESTERN ELECTRIC COMPANY, INCORPORATED, OF NEW YORK, N. Y., A CORPORATION OF NEW YORK.

MATERIAL-WORKING MECHANISM.

Application filed April 28, 1924. Serial No. 709,340.

This invention relates to material working mechanisms and more particularly to a mechanism for slotting blanks.

In certain types of slotted screws, for instance screws with large diameter but shallow heads, it is necessary that the slot be formed with a flat bottom for the reason that if the slot in this type of screw were formed with the usual arc shaped bottom and extended completely across the head to the requisite depth, it would necessitate forming it so deep that it would extend through the head into the shank of the screw thereby weakening the head and if the slot were formed to the requisite depth at the center of the head the slot would be too short.

The object of this invention is to provide an improved mechanism for producing a slot of uniform depth in a blank.

In order to attain these objects in accordance with the features of the invention, there is provided in one embodiment of the invention a mechanism which includes a screw slotting mechanism comprising a suitable screw feeding and indexing mechanism associated with a rotatable slotting saw adapted to be first lowered at one side of the screw and to the depth at which it is desired to slot the screw head and thereafter to be moved across the screw head in a straight line to form a slot of uniform depth, the movement of the saw being in consonance with the screw indexing mechanism.

It is believed that the invention will be clearly understood from the following description and the accompanying drawings in which, Fig. 1 is a fragmentary plan view of a screw slotting machine embodying the features of the invention;

Fig. 2 is a vertical section taken upon the line 2—2 of Fig. 1 looking in the direction indicated by the arrows;

Fig. 3 is a detail section on the line 3—3 of Fig. 1 looking in the direction indicated by the arrows;

Fig. 4 is a detail section on the line 4—4 of Fig. 1 looking in the direction indicated by the arrows and showing the universal drive for the saw;

Fig. 5 is an enlarged fragmentary perspective detail view of a portion of Fig. 1 showing means for adjusting the slotting mechanism horizontally upon the frame of the machine;

Figs. 6 and 7 are views showing types of screws having shallow heads of comparatively large diameter in which it is necessary to provide flat bottomed slots, and Fig. 8 is a schematic view of the saw illustrating the various positions thereof while moving from its normal position to completion of a slotting operation.

In the drawings in which like reference numerals designate similar parts throughout the several views 10 indicates the frame of the machine and 11 represents a push rod carrying at its lower end a roller 12 (Fig. 2) which engages a cam 13 deriving its motion from the main driving element (not shown) of the machine. The upper end of the push rod 11 is secured to the short arm 16 of a bell crank lever 17, the normal position of which may be adusted by means of a screw 18 adjustably secured in the long arm 19 of the lever 17 and abutting a suitable surface formed on the arm 19. The lever 17 is fixed to one end of a shaft 20 which carries on its opposite end, and rigidly connected thereto, an arm 22 which, through a connecting link 23 and a reciprocable arm 24, is connected by screw threads 25 (Fig. 2) to a reciprocable bearing 27 suitably supporting a disc saw 30 (Figs. 3 and 4). It will readily be seen that by adjusting the screw 18 the normal position of the saw 30 relative to the head of the screw to be slotted may be adjusted so that the axis of the saw will be in line with the periphery of the head of the screw so that during its movement downward to the depth of the slot to be cut a substantial portion of the slot will be formed.

The shaft 20 is revolvably mounted at either end upon the long arms of parallel rocker arms 31 and 32 which are keyed to a rocker shaft 33, and a spring 35 connects the long arm 19 of the bell crank lever 17 to the rocker arm 31. A bent bar 36 secured to a bracket 37 carries an adjustable screw 38 which projects into the path of the rocker arm 31 and is engaged thereby at the end of its upward movement the purpose of which will be explained later. The resistance of the spring 35 is such that as the push rod moves upward no relative movement between the lever 17 and the rocker arms occurs until the rocker arm 31 engages the screw 38. The shaft 33 is supported in a bearing 39 which is formed upon the bracket 37, the bracket being adjustably mounted upon a laterally adjustable plate 40 by screws 41 passing through openings 42 formed in the foot of the bracket 37 and plate 40 and threaded into the frame 10 (Figs 1 and 2), nuts 43 threaded upon the ends of the screws 41 rest against washers 44 of suitable size. The foot of the bracket 37 is slotted as indicated at 45 into which slot projects a pair of lugs 46 (Fig. 5) formed integrally upon the laterally adjustable plate 40 slidably mounted upon the frame 10 of the machine. Threaded into the foot of the bracket 37 and upon a line intermediate the lugs 46 is an adjusting screw 47 provided with a slotted hexagonal head 48 and an enlargement 49 located intermediate the head and the screw threaded shank. Entered between the head 48 and the enlargement 49 upon the screw 47 are the lugs 46 and upon turning the screw 47 after loosening the nuts 43 the bracket 37 may be minutely moved upon the plate 40. This adjustment is necessary only when the depth of the slot to be cut is varied. It will readily be seen that by moving the bracket 37 to the right as viewed in Fig. 2 the distance the saw will travel before engaging the head of the screw to be slotted will be increased thereby decreasing the depth of the slot formed when the saw is moved down and vice versa when the bracket 37 is moved to the left. Whenever the position of the bracket is changed it generally is necessary to adjust the screw 18 to insure that the axis of the saw will aline with the periphery of the head of the screw as heretofore described. The screw 38 is adjusted only when the machine is set up to insure that the longitudinal movement of the saw across the head takes place in a plane parallel therewith. When the proper adjustment has been made the lower surface of the reciprocable bearing 27 will lie in a plane parallel with the top surface of the head to be slotted after the saw is rocked downward to engage therewith. Thus the saw in its movement across the head of the screw 51 will form a slot therein parallel with the top face of the head. This last movement takes place upon the arm 31 engaging the screw 38. As indicated at 50 (Figs. 1 and 2) a similar adjusting means comprising a screw 47' and a pair of lugs 46' are provided for adjusting the plate 40 laterally upon the frame 10 to provide for centering the saw 30 with the axis of the screw 51 to be slotted, the lugs 46' in this case being formed upon the frame 10 instead of upon the plate 40. The adjustment of the plate 40 is only necessary when the machine is being set up and that of the bracket 37 when another size screw is to be slotted or when the depth of the slot to be formed is changed. The adjustment necessary of the bracket 37 upon the plate 40 and of the plate 40 upon the frame 10 is very minute so that no change is necessary in the relation between the cam 13 and roller 12 carried by the push rod 11. The screws 51 to be slotted pass down a feed chute 53 into which they are fed from a suitable hopper (not shown), incorporated in the machine. From the feed chute the screws pass one at a time into a clamping disc 54 forming part of the machine and suitably rotated in the direction indicated by the arrow 55 from the main driving element of the machine. While the saw 30 and associated parts are being returned to their normal position the clamping disc 54 indexes another screw for slotting. The mechanism for feeding and indexing the screws to be slotted is well known in the art since it is incorporated in one form or another in all standard screw slotting machines.

The saw 30 is driven through a gear 56 supported upon the rocker shaft 33 suitably driven from the main driving element of the machine. The gear 56 meshes with a gear 57 secured to a fixed spindle 60 (Fig. 4) carried by the short arm of the rocker arm 31. Suitably secured to the reciprocable bearing 27 is a spindle 61 connected by a suitable universal coupling 62 to the fixed spindle 60, the rotation of the spindle 60 being transmitted to the reciprocating saw through the universal coupling 62 in a manner well known in the art.

The operation of the machine as a whole is briefly as follows:

In Fig. 2 the parts are shown in their normal position with a screw blank 51 indexed by the screw clamping disc 54 in position ready to be slotted and the lower edge of the saw 30 positioned above the head of the screw and its axis positioned in vertical alinement at the left side thereof ready to be lowered the depth of the slot to be cut in the head of the screw. The first step in the cycle of operation occurs when the push rod 11 is raised by the cam 13 and with it the short arm 16 of the bell crank lever 17, which owing to its connection with the long arm of the rocker 31 through the resistance of the spring 35 rotates the rocker arms 31 and 32 bodily with the shaft 33 in the bearing 39 in a clockwise direction. The movement upward of the rocker arms 31 and 32 continues until the arm 31 encounters the adjustable screw 38 when the motion of the rocker arm is arrested, at which instant the saw 30 has been lowered from its normal position above the head of the screw to the depth of the slot to be cut in the head. During the lowering of the saw to the depth of the slot to be formed substantially one-half of the width of the slot will be formed depending upon the diameter of the saw, since the axis of the saw is mounted in direct alinement with the periphery of head of the screw. This position of the saw is indicated in dotted outline on Fig. 8 by the numeral 65. Further upward movement of the push rod 11 caused by the cam 13, overcoming the resistance of the spring 35, causes rotation of the shaft 20, carrying at its opposite end the arm 22. The arm 22 is thereby rocked in a clockwise direction and being connected to the reciprocable arm 24 by the link 23 causes the arm 24 to move to the left. The arm 24 being connected to the reciprocable bearing 27 which has suitably mounted therein the rotatable spindle 61 carrying the saw 30 causes the saw 30 to be moved across the head of the screw 51 to the position indicated in dotted outline on Fig. 8 by the numeral 66 which movement results in the completion of a flat bottomed slot in the screw 51 as clearly indicated in the screws illustrated in Figs. 6 and 7. During the lowering and reciprocable movement of the saw 30 as just described the saw is revolved due to the universal coupling 62 between the fixed spindle 60 and the spindle 61 mounted in the reciprocable bearing 27. Upon the saw reaching the position indicated in dotted outline by the numeral 66 on Fig. 8 the cam allows the push rod 11 to move down which movement is facilitated by the spring 35 due to the energy stored therein during the upward movement of the push rod 11, and a spring 68 (Fig. 1) secured at one end to the shaft 20 with its opposite end (not shown) suitably secured to the frame of the machine thereby restoring all parts to their normal position as indicated in Fig. 2. The saw in its movement back to its normal position moves in the path as just described for the slotting operation only in reverse order. While the mechanism is being returned to its starting position the screw clamping disc 54 indexes another screw for slotting and the slotting operation proceeds as before and thus continues.

What is claimed is:

1. In an automatic screw slotting mechanism, a rocker arm, a cutter mounted thereon, means for rocking said arm to move the cutter to the depth of the slot to be formed, means for imparting motion to said cutter thereafter to move said cutter across the surface to be slotted in a continuous plane parallel thereto, and means for continuously rotating said cutter during such movements.

2. In an automatic screw slotting mechanism, a rocker arm, a cutter mounted thereon for rotative and longitudinal movement, means for rocking said arm to move the cutter to the depth of the slot to be formed and thereafter longitudinally upon the arm and across the surface to be slotted and finally in a reverse path of travel back to its normal position, the movement of the cutter across the surface slotted being in a continuous plane parallel thereto, and means for continuously rotating said cutter during such movement.

3. In an automatic screw slotting mechanism, a rocker arm, a block mounted to slide thereon, a rotary cutter mounted upon said block, means for rocking said arm to move the cutter to the depth of the slot to be formed, means for causing said block to slide longitudinally upon the arm to move said cutter across the surface to be slotted in a continuous plane parallel thereto, and means for continuously rotating said cutter during such movements.

4. In an automatic screw slotting mechanism, a rocker arm, a cutter mounted thereon, for rotary and reciprocatory movement, means for rocking said arm comprising an actuating member yieldably connected thereto and arranged during the first part of its movement to rock said arm to move the cutter to the depth of the slot to be formed and upon a further movement to impart a longitudinal movement to the cutter upon the rocker arm to cause said cutter to be moved across the surface to be slotted in a continuous plane parallel thereto, and means for rotating said cutter during such movements.

5. In an automatic screw slotting mechanism, a plurality of rocker arms, an adjustable stop for limiting the movement of said arms, a cutter mounted upon one of said arms for rotary and longitudinal movement, means for rocking said arms comprising a cam actuated push rod pivotally connected thereto, yieldable means associated therebetween and arranged to cause said arms to be moved against said stop upon actuation of said push rod and thereafter to allow relative movement between said arms and push rod, a system of levers operatively connected to said push rod and arranged to impart a longitudinal movement to said cutter upon the arms coming to a halt against said stop, the movement of said arms against said stop causing said cutter to be moved to the depth of the slot to be formed and the longitudinal movement of the cutter upon the arm causing said cutter to be moved across the surface to be slotted in a continuous plane parallel thereto, and means for rotating said cutter during such movements.

6. In an automatic screw slotting mechanism, means for holding screws during slotting thereof, an adjustably mounted bracket, a plurality of rocker arms carried thereon, a cutter mounted upon one of said arms for rotary and reciprocatory movement, means for rocking said arms to move the cutter to the depth of the slot to be formed and for imparting a reciprocatory movement to the cutter thereafter to move said cutter across the surface to be slotted in a continuous plane parallel thereto, means for rotating said cutter during such movements, means for varying the rocking movement of said arms towards the surface to be slotted and thereby the depth of the slot to be formed, and means for adjusting the movement of the rocker arms to cause the cutter to be moved in a plane parallel to the surface to be slotted.

In witness whereof, we hereunto subscribe our names this 16th day of April, A. D. 1924.

CHARLES GUNNAR HOLMBERG.
JOHN STANLEY STULL.